April 15, 1941.  M. C. CAMPBELL  2,238,580
STAKING TOOL
Filed May 18, 1938  2 Sheets-Sheet 1
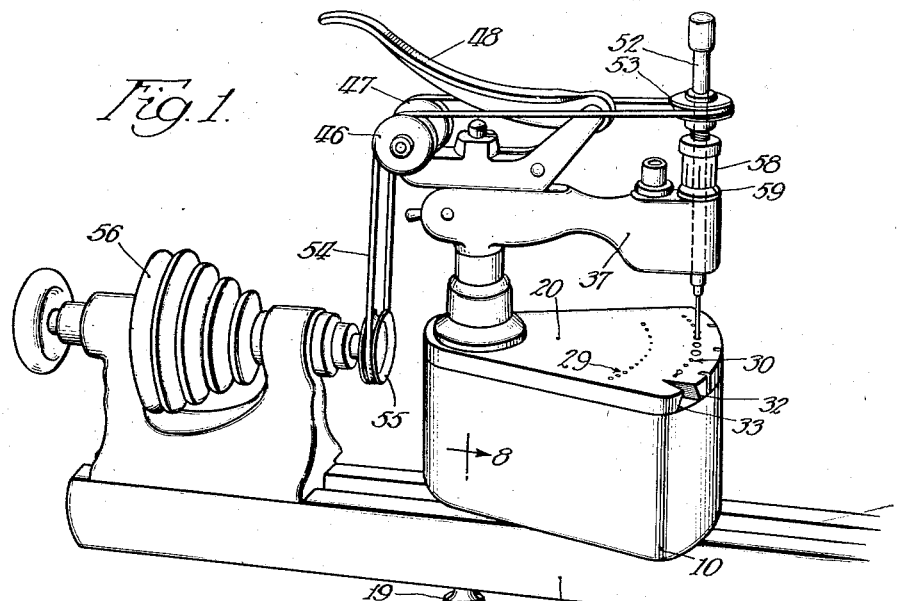
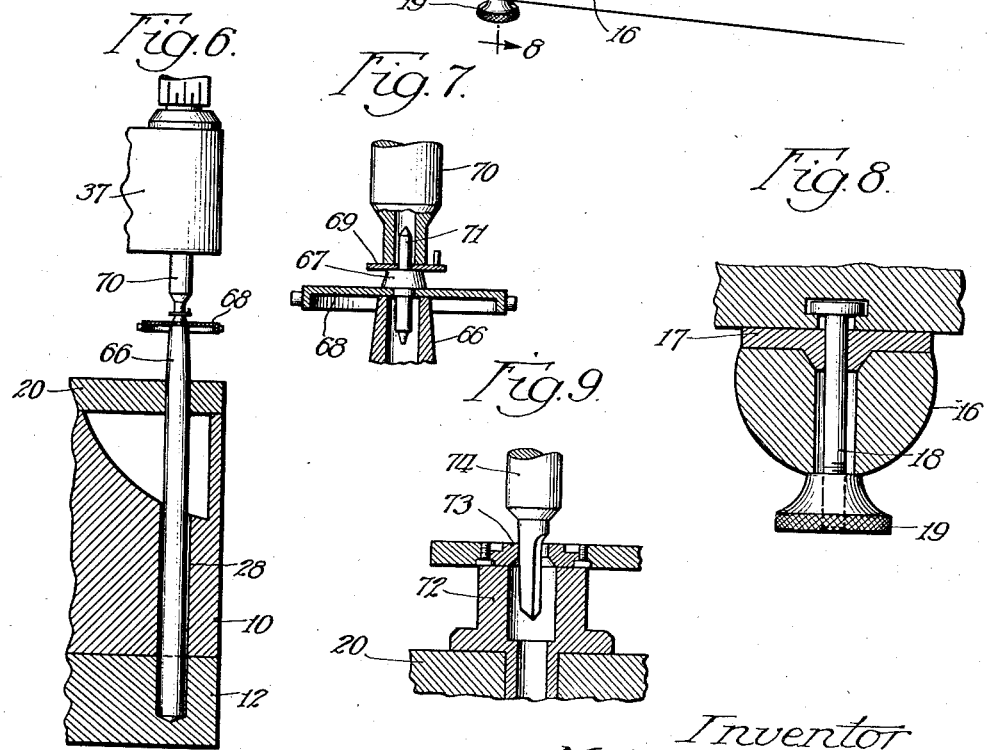
Inventor
Milton C. Campbell
By April 15, 1941. M. C. CAMPBELL 2,238,580
STAKING TOOL
Filed May 18, 1938 2 Sheets-Sheet 2
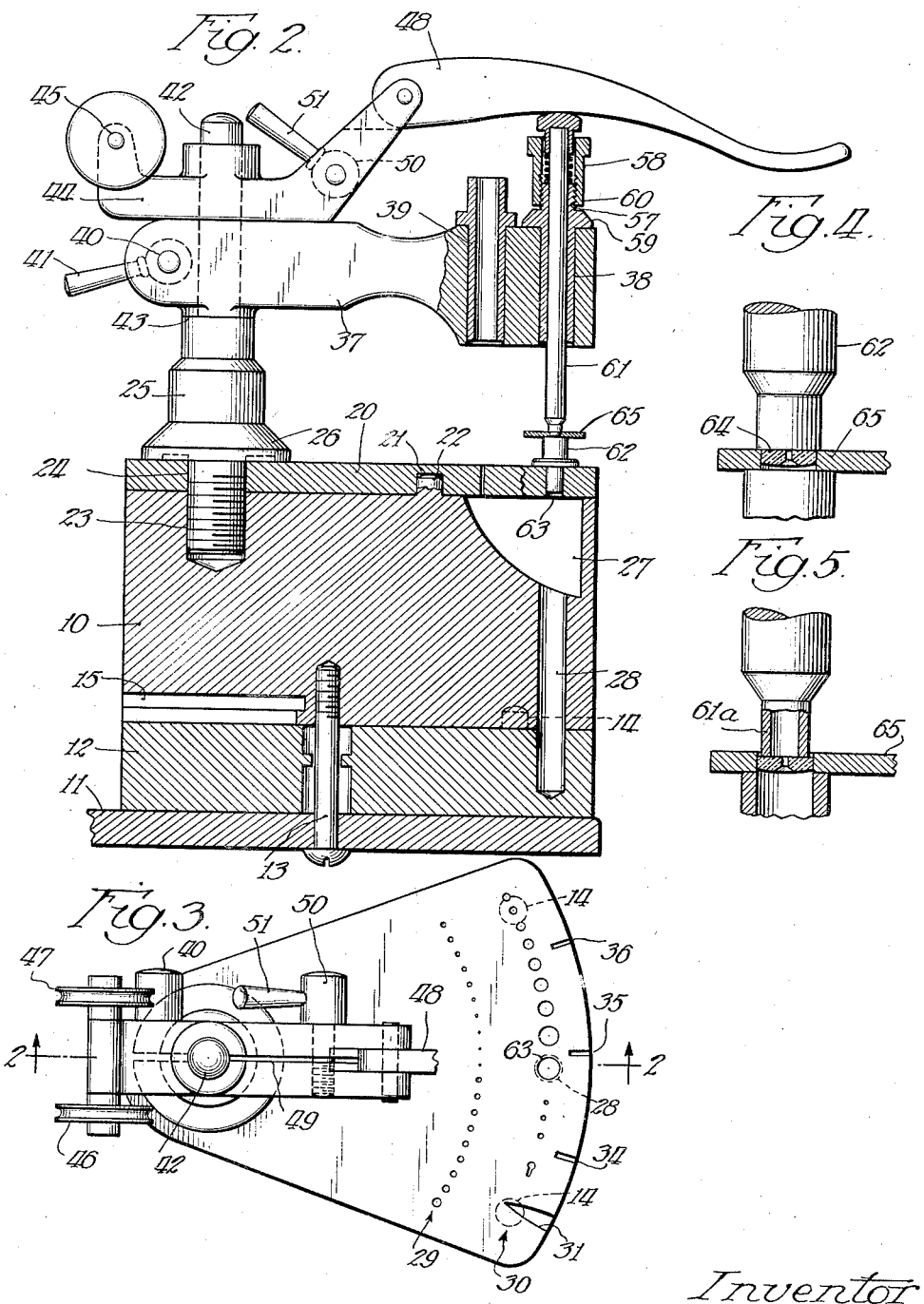
Inventor
Milton C. Campbell Patented Apr. 15, 1941

2,238,580

UNITED STATES PATENT OFFICE 2,238,580

STAKING TOOL

Milton C. Campbell, Elmhurst, Ill., assignor to C. & E. Marshall Company, Chicago, Ill., a corporation of Illinois Application May 18, 1938, Serial No. 208,552

7 Claims. (Cl. 29—10)

The present invention relates to tools for watchmakers, and particularly to what is commonly termed a staking tool. The principal purpose of the invention is to provide a staking tool which is capable of being used for a greater variety of operations than it has heretofore been possible to obtain from a single tool.

The invention contemplates a staking tool that is readily adaptable for precision drilling, reaming, and jewel setting and removing. The tool is universal for all sizes of watches, so that the repair work on new or old models and small or large watches may be made with ease and with the same degree of accuracy, regardless of the type of watch.

One feature of the invention consists in the provision of a stationary die plate in combination with a swinging arm over the die plate having a direct pressure lever.

Another feature of the invention is the provision in a staking tool of a base adapted to support the stationary die plate and provide clamps beneath it whereby the several tools may readily be applied and in which punches may be inverted and held in the base to be used as stumps. The staking tool is so constructed that it may be mounted directly upon the usual table or directly upon a lathe bed where power may be obtained for drilling.

The staking tool also embodies a micrometer depth adjustment which is particularly useful in setting jewels since it enables the watchmaker to predetermine the depth of an old jewel and set a new jewel to the same depth by simple, accurate means of adjustment.

The features and advantages of the invention will appear more fully as the description proceeds, reference being had to the accompanying drawings wherein a preferred form of the invention is shown. It is to be understood, however, that the drawings and description are illustrative only, and are not to be taken as limiting the invention except insofar as it is limited by the claims.

In the drawings,

Fig. 1 is a perspective view showing the staking tool in place upon a lathe where it is attached to the lathe bed or shoe in place of a T-rest;

Fig. 2 is a longitudinal sectional view through the staking tool;

Fig. 3 is a plan view of the staking tool with certain parts broken away;

Fig. 4 is an enlarged fragmentary view showing the manner in which the tool may be used in setting jewels;

Fig. 5 is a fragmentary view like Fig. 4 illustrating a further step in jewel setting;

Fig. 6 is a fragmentary view showing the manner in which the staking tool makes it possible to invert punches and use them for stumps;

Fig. 7 is a fragmentary sectional view illustrating the use of the staking tool to press small gear wheels upon a shaft;

Fig. 8 is a fragmentary sectional view taken on the line 8—8 of Fig. 1; and

Fig. 9 is a fragmentary sectional view illustrating how the staking tool may be utilized in reaming out a jewel setting.

Referring now to the drawings, the invention is embodied in a staking tool comprising a base 10 of a suitable metal which is adapted to be mounted, as shown in Fig. 2, upon a bench 11 by means of a mounting plate 12 and a screw bolt 13. The base 10 may desirably have sockets such as 14 to receive a corresponding pin on the mounting plate 12. The base 10 has a T-shaped slot 15 therein extending inwardly from one end, by which the base may be mounted upon a lathe 16. The manner of mounting the base upon the lathe 16 is to rest the base upon the shoe 17 of the lathe and clamp it in place by means of a headed bolt 18, the head of which rides in the T-shaped slot 15. A knurled nut 19 is provided for the bolt 18. The base 10 has a stationary die plate 20 mounted on the top thereof, the die plate having a socket 21 in the bottom thereof which is adapted to receive a pin 22 on the base. In addition, the base is provided with a screw threaded recess 23 and the stationary plate has an opening 24 to receive a post 25. The post 25 is threaded into the recess 23 and clamps the stationary plate 20 upon the base 10. A flange 26 is provided on the post 25 for bearing down upon the top surface of the die plate 20.

The base 10 is recessed along the edge thereof opposite the post 25 to provide a chamber 27 beneath the stationary die plate 20. In addition, the chamber 27 is extended by providing several punch wells 28 extending down from the chamber 27 into the mounting plate 12. The shape of the base and the die plate 20 in horizontal cross-section may be likened to a segment of a disc or cylinder in which the post 25 is at the center of the disc and the chamber 27 is adjacent the periphery thereof. The stationary die plate 20 has two rows 29 and 30 of openings adapted to receive drills, stumps, punches and the like. In addition, a V-shaped notch 31 is provided in the circular outer edge of the die plate. This notch is particularly useful in driving the pinions out of gear wheels and the like. The shape of the notch is such that it is narrow at the top, the side walls being cut away as indicated at 32 and 33 in Fig. 1. Other notches such as 34, 35 and 36 are provided in the circular edge of the die plate, the width of the notches being varied so that they may be used for different purposes.

The post 25 supports an arm 37 which is mounted to swing horizontally over the die plate 20 and which carries a tool guide 38 over the row 30 of openings in the stationary die plate. The arm 37 also carries a second tool guide 39 which is vertically aligned with the row of openings 29 in the die plate. The arm 37 is slotted at its back side and is clamped to the post 25 by a clamping screw 40 that may be tightened or released by a handle 41. The post 25 has a reduced portion 42 for mounting the arm 37. A shoulder 43 acts to limit the downward movement of the arm 37.

In addition, the reduced portion 42 of the post 25 is adapted to support a push lever carrying bracket 44. This bracket carries a shaft 45 which may be used to mount a plurality of pulleys 46 and 47. Furthermore, the bracket 44 has pivoted thereto a push lever 48 which is adapted to swing down over the tool guides 38 and 39 and be utilized to apply direct pressure to a tool in either of the guides. To lock the bracket 44 in place on the reduced portion 42 of the post 25, the bracket is slotted, as indicated at 49 in Fig. 3, and a clamping screw 50 is adapted to draw the opposing sides of the bracket toward each other. The screw 50 has a handle 51.

In Fig. 1 the staking tool is shown as connected for drilling. In this case, a drill stem 52 having a pulley 53 fixed thereon is mounted in the tool guide 38. A belt 54 is trained around the pulley 53 and over the pulleys 46 and 47 to a drive pulley 55 which is mounted on the lathe 16. The pulley 55 is adapted to be driven from any suitable source of power through the stepped pulley 56. The simple structure of the staking tool makes it possible to use it in this fashion for drilling and to use it for its other purposes merely by removing the drill stem 52 and the belt 54.

The tool guide 38 has a micrometer adjustment thereon for determining the depth to which a tool inserted therein extends. The guide 38 is in the nature of a sleeve mounted in the arm 37. It is screw threaded at its top end as indicated at 57 to receive an adjustable sleeve 58. The guide 38 has a bevelled flange 59 immediately below the sleeve 58 and the sleeve has its lower portion 60 marked with a suitable scale which cooperates with a scale on the flange 59 to determine the depth the sleeve 58 is raised or lowered by rotation thereof.

In Figs. 4 and 5 there are illustrated two steps in the setting of a jewel by the present device, utilizing a pusher such as is shown in Fig. 2 at 61 above the jewel setting and a stump 62 mounted in one of the openings 63 of the row 30. The operator may force a jewel such as shown at 64 in Fig. 4 into place. The pusher 61 used for the first operation is usually larger than the opening in which the jewel is to be set, so that when pressure is applied to the head of the pusher by the lever 48, the jewel is brought down until the top thereof is flush with the top of the surrounding plate or setting 65 (see Fig. 4). For the final setting of the jewel a hollow ended pusher 61a, such as is shown in Fig. 5, is used. This pusher is inserted in the guide 38 and the sleeve 58 is adjusted until the pusher rests directly on the jewel. The sleeve 58 is then turned to lower it the amount it is desired to depress the jewel, and thereafter pressure is applied to the head of the pusher to force the jewel into place. Quick, accurate jewel setting is thus accomplished.

In Figs. 6 and 7 the use of the device in driving wheels onto shafts is illustrated. In Fig. 6 a hollow punch 66 is inverted and seated in the well of the base 10. The top or operating end of the punch is then used as a seat for a spindle 67 on which are mounted the two wheels 68 and 69. The wheel 68 is shown as already in place, and the wheel 69 is being pressed by a second punch 70, also hollow, so as to receive the small end 71 of the spindle 67.

In Fig. 9 there is illustrated the manner of using the device for reaming out jewel settings and larger jewels. In this case, a stump 72 is mounted in one of the openings in the stationary die plate 20 and the watch plate containing a jewel setting 73 is positioned on the stump 72. A reamer 74 is then inserted in the guide 38 and may be operated in the usual manner to ream out the opening in the jewel setting 73 to a larger size.

Many other operations may be carried out with this tool. The examples given here, however, are believed to be sufficient to illustrate the flexibility and adaptability of the tool for the many operations necessary in watchmaking and repairing.

Having thus described my invention, what I claim as new and desire to secure by Letters Patent is:

1. A staking tool for watchmakers comprising a base having means whereby it may be fixed upon a support, a die plate, means for clamping said die plate on said base, said means comprising a post secured in said base, an arm journalled on said post to swing over said die plate, and a plurality of radially spaced punch guides carried by said arm.

2. In a staking tool for watchmakers a base having means to fix the same upon a support, a post mounted on said base adjacent one end thereof, a die plate, means on said post and said base to hold the die plate rigidly in place on the base, said die plate having rows of openings arranged in concentric circular segmental rows about the center of said post and an arm pivoted on said post, said arm having tool guides vertically aligned with said segmental rows.

3. In a staking tool for watchmakers a base having means to fix the same upon a support, a post mounted on said base adjacent one end thereof, a die plate, means on said post and said base to hold the die plate rigidly in place on the base, said die plate having rows of openings arranged in concentric circular segmental rows about the center of said post and an arm pivoted on said post, said arm having tool guides vertically aligned with said segmental rows, said base having a pocket beneath said openings.

4. A tool of the character described having in combination a stationary die plate, a tool guide mounted over said die plate in spaced relation thereto, said tool guide comprising a horizontally swinging arm having a tool guide sleeve therein and a micrometer adjustment sleeve screw threaded on the first named sleeve.

5. A staking tool of the character described, comprising a base, a die plate fixed thereon, an arm mounted on said base for horizontal movement over said die plate and a direct pressure lever pivoted on said arm, said arm having a punch guide therein, said base having a T-slot in the bottom thereof for clamping it to a lathe.

6. In a tool of the character described, a base, a die plate covering said base, said base having a threaded socket in the top thereof adjacent one end and said die plate having an opening over said socket, a post threaded in said socket and having a flange for clamping the die plate to the base, said post projecting vertically from said base, an arm mounted for horizontal swinging movement on said post, said arm having a tool guide spaced from said post, a bracket having means to clamp it onto said post over the arm, and a direct pressure lever mounted on said bracket and adapted to extend over said tool guide.

7. In a tool of the character described, a base, a die plate covering said base, said base having a threaded socket in the top thereof adjacent one end and said die plate having an opening over said socket, a post threaded in said socket and having a flange for clamping the die plate to the base, said post projecting vertically from said base, an arm mounted for horizontal swinging movement on said post, said arm having a tool guide spaced from said post, a bracket having means to clamp it onto said post over the arm, a direct pressure lever mounted on said bracket and adapted to extend over said tool guide, said tool guide comprising a sleeve loosely mounted in said arm and having a shoulder resting on top of the arm, and a micrometer adjustment sleeve screw-threaded on the first named sleeve.

MILTON C. CAMPBELL.